United States Patent
Cummins

(10) Patent No.: US 6,483,268 B1
(45) Date of Patent: Nov. 19, 2002

(54) DC MOTOR BRAKE

(76) Inventor: Michael D. Cummins, 2869 Long Lake Dr., Titusville, FL (US) 32780-7544

(*) Notice: Subject to any disclaimer, the term of this patent is extended or adjusted under 35 U.S.C. 154(b) by 191 days.

(21) Appl. No.: 09/693,617

(22) Filed: Oct. 20, 2000

(51) Int. Cl.[7] ................................. H02P 3/00
(52) U.S. Cl. ................. 318/362; 318/375; 318/381
(58) Field of Search ..................... 318/258, 269, 318/362, 372, 375–381

(56) References Cited

U.S. PATENT DOCUMENTS

| | | | | |
|---|---|---|---|---|
| 3,660,738 A | * | 5/1972 | Anderson et al. ........... | 318/375 |
| 5,712,549 A | * | 1/1998 | Engel ......................... | 318/376 |
| 5,764,009 A | * | 6/1998 | Fukaya et al. .............. | 318/376 |
| 5,847,522 A | * | 12/1998 | Barba ......................... | 318/269 |
| 6,373,207 B1 | * | 4/2002 | Yablonovitch .............. | 318/362 |

* cited by examiner

*Primary Examiner*—Marlon T. Fletcher
(74) *Attorney, Agent, or Firm*—J. Sanchelima; A. Bordas

(57) ABSTRACT

An electronic brake system for D.C. motors that utilize an electronic switching device in parallel with the motor upon the removal of a D.C. source. A bias circuit is connected to the switching device to keep it in the OFF condition while the D.C. source is applied to the motor. Upon disconnecting the D.C. source, through another switch, the electronic switching device can also be independently biased to permit the motor to coast. A properly biased FET can be used as the electronic switching device with a voltage limiting device connected from the gate to the source, such as a zener diode.

2 Claims, 1 Drawing Sheet

DC MOTOR BRAKE

BACKGROUND OF THE INVENTION

1. Field of the Invention

The present invention relates to a DC motor brake system, and more particularly of the type that uses a solid state switching to short the motor.

2. Description of the Related Art

Many designs for DC motor brakes have been designed in the past. Current art discusses a switch being used to place a "short circuit" across a turning/rotating DC motor. The kinetic needs to be dissipated for the rotating motor to stop. A rotating DC motor acts as a DC generator and the short circuit is applied to "brake" the "motor/generator". Driving a generator into a "short circuit" develops an infinite current (I=E/0=dividing "some voltage" by zero). In this case where we are applying a short circuit, current equals voltage divided by almost zero resistance of the active switching element and internal impedance of the motor generator. This, abruptly stops the motor/generator since "infinite current requires infinite torque", and is therefore unattainable. In the present invention a very low resistance is applied to brake the motor/generator and current is thus correspondingly high.

The brakes used for D.C. motors in the past typically include a mechanical switch element. Several problems can arise since the mechanical switch cannot "switch in zero time". The mechanical switch also exhibits some mechanical "contact bounce" and thus the generator does not see a resistance of "zero ohms" continuously. Braking action is adversely affected by some inconsistencies in switching time, contact arcing/welding of switch contacts by the high currents generated and the switch contacts and associated circuit resistances are not zero ohms. Therefore, the current is limited.

SUMMARY OF THE INVENTION

It is one of the main objects of the present invention to provide an electronic brake system for D.C. motors that eliminates the problems found with those that use mechanical components, including switch contact bouncing.

It is another object of this invention to provide an electronic brake system that allows a D.C. motor to coast to a stop irrespective of whether the power is lost.

It is still another object of the present invention to provide a very fast switching electronic brake.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
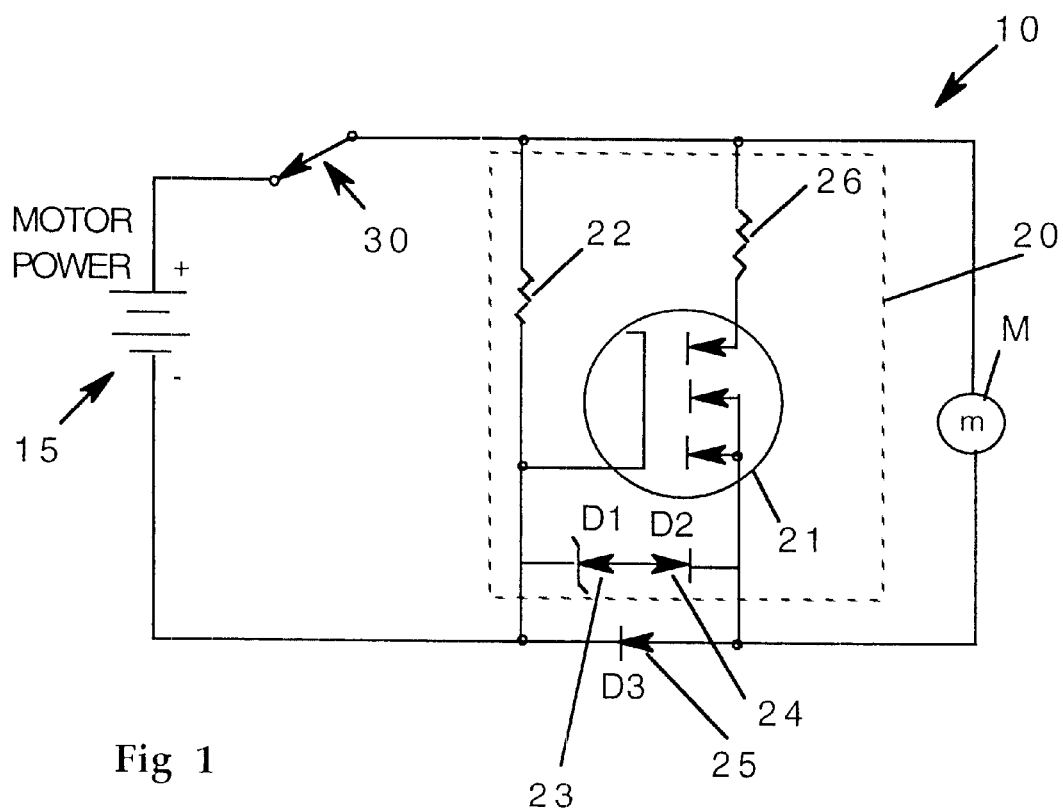
FIG. 1 represents a schematic for one of the preferred embodiments for the electronic brake incorporating the present invention.

Referring now to the drawings, where the present invention is generally referred to with numeral 10, it can be observed that it basically includes a power source 15, electronic switching device 20 in parallel with D.C. motor M, and switch assembly 30.

In FIG. 1 a D.C. motor M is connected in parallel with electronic brake assembly 10 which includes FET transistor 21, resistor 22, zener diode 23, diode 24, diode 25, and resistor 26(if required). The D.C. motor becomes a generator when "coasting to a stop" when the drive power is removed. Depending on the motor, there is an interval impedance that also limits the current generated when a short circuit is applied.

Transistor 21 is an N-channel, enhancement mode, field effect power transistor, such as IRFZ44E manufactured by International Rectifier. An enhancement mode FET is normally biased "OFF" and must have a positive (gate-to-source) bias voltage applied to conduct. Transistor 21 acts as a very fast switch with about 10 nanoseconds "ON" time. Transistor 21 has an ON-resistance of approximately 0.025 ohms is approaching zero". Also, Transistor 21's "ON" time switching of 10 nanoseconds is not "zero time", but it is very fast, much faster than any mechanical switch and with no contact bounce or arcing.

Diode 25 is a "fast recovery" power rectifier to keep transistor 21 reverse biased (gate-to-source negative) during motor "run" and also blocks conduction from the motor/generator during motor "halt". The voltage across this diode is typically about 1.5 volts during conduction, and this assures the transistor 21 is biased to the "OFF" condition.

Diode 23 is a 12 volt zener diode to limit the transistor 21's "ON" voltage from "gate-to-source" to about 12 volts during the braking time. D2 is a fast switching rectifier to assure there is no forward conduction through the zener during RUN condition, but conducts during HALT. All RUN current for the motor conducts through diode 25. At HALT, current conducts from the "motor/generator" through zener diode 23 and diode 24 to forward bias the transistor 21 which conducts and places a "short circuit" (in the order of 25 milliohms) across the motor/generator M.

Resistor 22 is a gate resistor with a large value resistance of at least 100 k that limits the current and voltage applied to the gate circuit.

Resistor 26 is a drain resistor with a small value of about 1 ohm and with power dissipation capacity. Resistor 26 limits the braking action. The motor can be stopped so fast that the motor can be destroyed. Therefore, limiting the current will also limit the brake action.

In "RUN" condition transistor 21 is OFF. All drive current to the motor passes through the forward biased diode 25 and produces a voltage drop of about 1 to 1.5 volts negative bias at the gate-to-source of transistor 21. This assures that transistor 21 is biased "OFF" as long as D.C. drive voltage 15 is applied by having switch assembly 30 in the RUN position.

Resistor 22 has a relatively large (100 k to 400 k) resistance rating and is designed to limit the current through zener diode 23 and diode 24. FET breakdown voltage is in the range of 20 v. Drive voltage to/from the motor (or motor/generator), depending on the motor design and fabrication, can be in excess of 100 volts. Typical D.C. motors are wound for operating voltages of 12 volts, 24 volts, 90 volts, and 180 volts, depending primarily on the motor application's requirements for power, speed, torque, etc.

In "HALT" or "BRAKE" condition diode 25 is biased "OFF" when drive voltage 15 is removed from the motor by having switch assembly 30 in the HALT position in FIG. 1. Transistor 21 turns "ON" by the motor M voltage (when the applied D.C. drive is removed, the motor becomes a generator). Resistor 22, zener diode 23 and (now) forward biased diode 24 apply a forward voltage on the gate of transistor 21. Zener diode 23 effectively limits the "ON" bias (FET gate-to-source) to about 12 volts.

With transistor 21 "ON", a short circuit (or very low resistance) is applied in parallel with the motor/generator M. Braking action occurs since the motor is a generator driving a "short circuit". Transistor 21 "turn-ON" time is about 10 nanoseconds, and its "ON" resistance is about 25 milliohms.

This circuit is totally passive and automatic: braking action will occur when D.C. drive power is removed (manually switched OFF or power is lost). This might pose some inconvenience since motor M will never coast to a stop. Braking action always occurs so is not directly under operator control when the voltage from power source 15 is not present.

Figure 2:
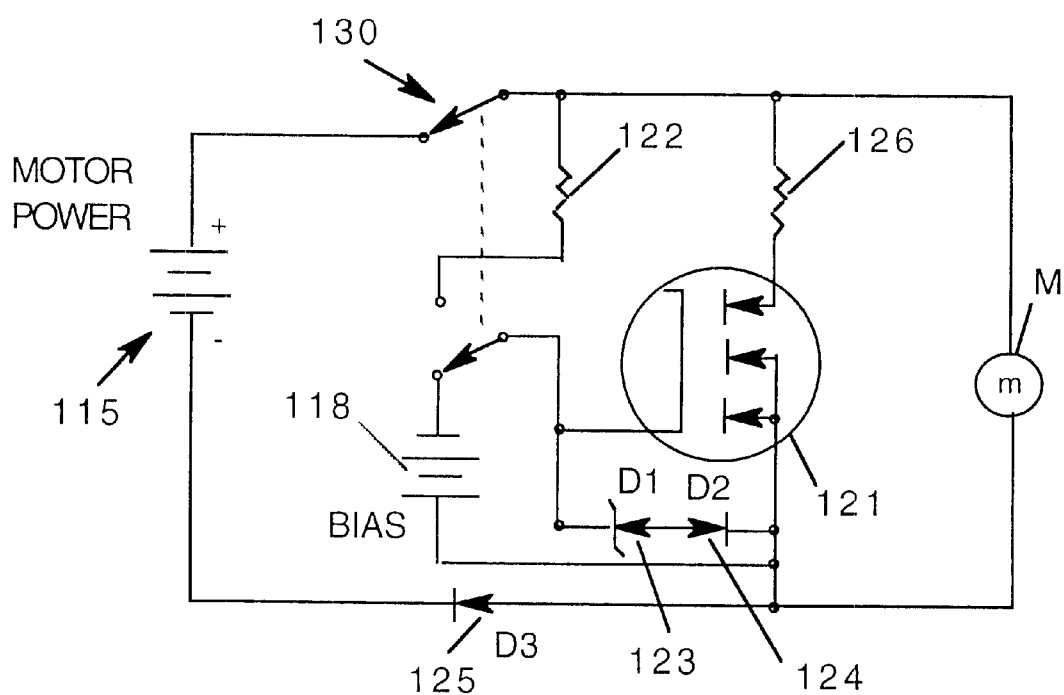
FIG. 2 shows a schematic for an alternate embodiment that permits a motor to continue coasting to a stop even if the D.C. power is lost.

In FIG. 2 an alternate embodiment is shown. The braking action is under the operator's control. Transistor 121 has a reverse bias applied from an isolated bias D.C. source 118 (battery, transformer coupled power supply, etc.) that applies a constant D.C. reverse bias to the FET "gate-tosource" contacts. Transistor 121 is biased "OFF" and does not conduct while the bias voltage is applied.

Motor M is under direct control of the operator. As long as the control switch is in the "RUN" position, transistor 21 is biased "OFF" and no braking action can occur. If power source 15 is lost or removed motor/generator M will coast to a stop.

When the control switch is place in the "HALT" position, power and bias sources 15 and 118 are removed and the circuit is identical to the one shown in in FIG. 1. Braking action occurs since D.C. motor M is turning and is acting as a generator. Transistor 121 is forward biased "ON". Resistor 122 acts as previously described resistor 22 in FIG. 1. The same applies for zener diode 123, diode 124 and resistor 126. Their connections are changed to allow operator control via switch assembly 30.

If more power is required due to a larger motor being used, the circuit can use several FETs in parallel to accommodate the higher power/current requirements. Transistor 21 and 121's "ON" condition are voltage controlled (being FET's) and these devices and are easily paralleled since they do not "current hog" as bipolar transistor's do. Therefore, the present invention has flexibility.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electronic brake device for D.C. motors, comprising:

A) first D.C. power source means having positive and negative terminals;

B) D.C. motor means having first and second input contacts connected to said positive and negative terminals;

C) first switch means connected in series with said first D.C. power source means to selectively interrupt the electrical connection with said D.C. motor means;

D) second switch means connected between said first and second input contacts and further including an electronic switching means biased in the OFF condition and being responsive to said selective interruption of said electrical connection to provide a low resistance ON connection between said first and second input contacts and said electronic switching means includes a voltage controlled transistor and bias circuit means for keeping said transistor in the OFF condition when the electrical connection between said first D.C. power source means and said D.C. motor means is established and causing said transistor to be in the ON condition when the electrical connection is interrupted; and E) a second D.C power source means for keeping said electronic switching means open and further including third switching means for selectively interrupting the connection of said bias circuit, said third switching means being coupled to said first switching means so that said first and second D.C. power source means can be selectably and simultaneously interrupted.

2. The electronic brake device set forth in claim 1 wherein said transistor includes a gate, a source and a drain, and said bias circuit means includes voltage limiting means connected between said gate and source so that the forward voltage applied between said gate and source is kept within a predetermined magnitude by said voltage limiting means and further including a diode connected between said negative terminal and said second input thereby ensuring that the voltage between said gate and source is reverse biased when said electrical connection is maintained.

* * * * *